March 2, 1965  D. M. STRATHEARN ETAL  3,171,721
ON-STREAM MIXER

Filed Sept. 21, 1959  2 Sheets-Sheet 1

INVENTORS
Lourdes V. McCarty
Donald M. Strathearn
BY
Attorney

March 2, 1965 D. M. STRATHEARN ETAL 3,171,721
ON-STREAM MIXER

Filed Sept. 21, 1959 2 Sheets-Sheet 2

INVENTORS
LOURDES V. McCARTY
DONALD M. STRATHEARN

BY Bayard H. Michael
ATTORNEY

United States Patent Office 3,171,721
Patented Mar. 2, 1965

3,171,721
ON-STREAM MIXER
Donald M. Strathearn, Arlington Heights, Ill., and Lourdes V. McCarty, Milwaukee, Wis., assignors to Controls Company of America, Schiller Park, Ill., a corporation of Delaware
Filed Sept. 21, 1959, Ser. No. 841,135
1 Claim. (Cl. 23—252)

This invention relates to mixing apparatus and process particularly suited for handling highly abrasive and adhesive materials of a fast setting nature but useable wherever "on stream" mixing is desired.

Compounds containing resin possess chemical and electrical characteristics which are desirable for sealing or encapsulating electrical components. Physically, the resin is an extremely adhesive material, and the addition of fillers to the resin to lower the shrinkage rate and to increase economy introduces an extremely abrasive characteristic to the material which presents problems in mixing. By the proper selection and proportioning of resin and filler together with the proper addition of a catalyst (hardener) the cure time can be brought down to a matter of minutes (assuming the resin, filler and hardener are hot when mixed). This aggravates the problem of mixing since we now have an extremely adhesive and abrasive material which must be completely mixed and poured into the mold quickly so that it will not set in the mixing equipment. This necessitates an on-stream type of mixing operation in which the filled resin (hereinafter referred to as resin) and the hardener are intermittently fed simultaneously at a proportioned rate to a mixer which will instantly mix the hardener and resin and purge itself completely of the mixed material so that it will not set within the mixer.

The primary object of this invention is, therefore, to provide a mixer for an epoxy resin encapsulant that will completely mix the resin and hardening agent on stream.

Another object of the invention is to provide a mixer which will purge itself completely after mixing the resin compound and hardening agent.

A further object of this invention is to provide a mixer for an epoxy resin which has few parts doing the actual mixing thus requiring few replacement parts.

A still further object of this invention is to provide a mixing device that can be quickly and easily disassembled for cleaning.

Other objects and advantages will be pointed out in, or be apparent from the specifications and claims as will obvious modifications of the single embodiment shown in the drawings in which:

Figure 1:
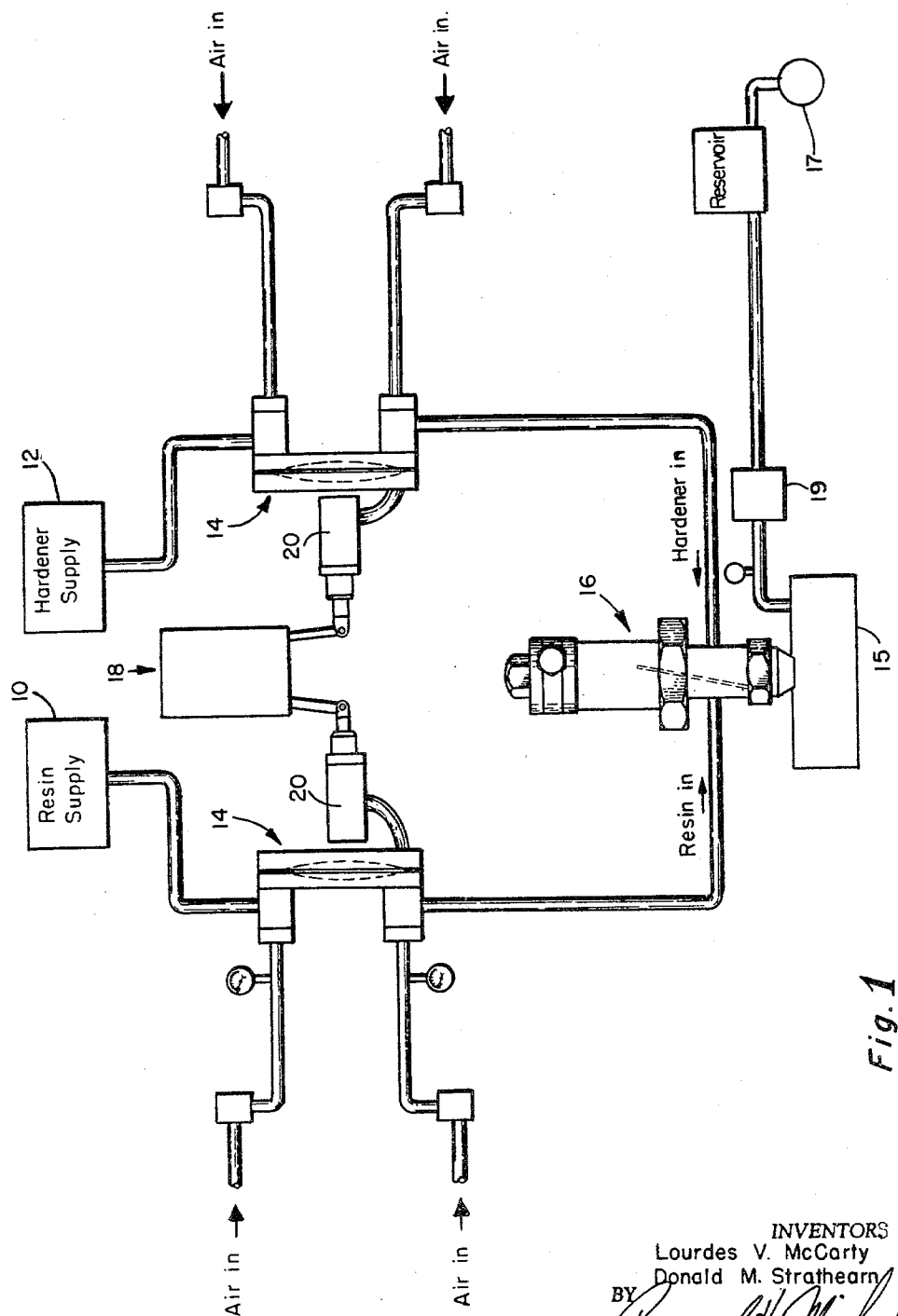
FIGURE 1 is a schematic view of the apparatus used for metering and mixing the resin compound.
Figure 2:
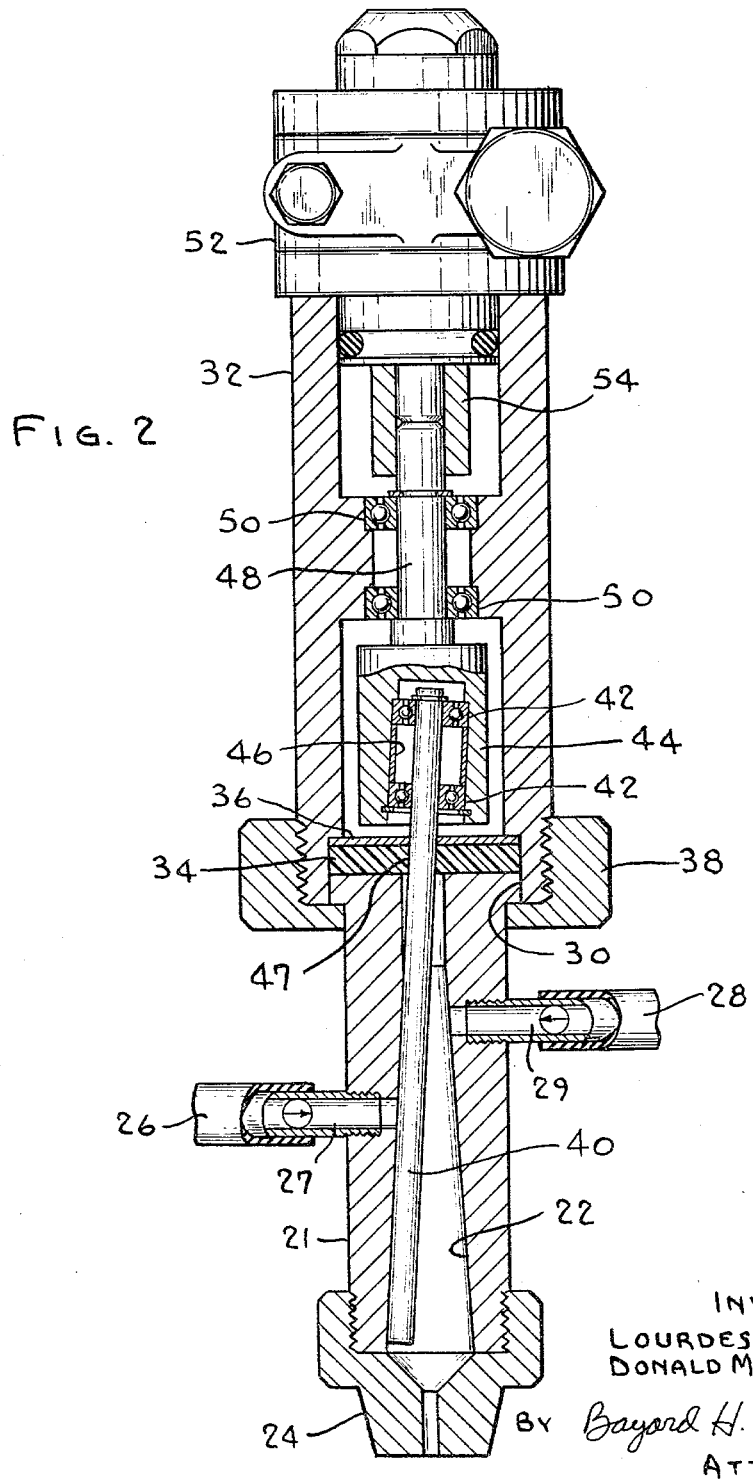
FIGURE 2 is a vertical section of the mixer used in the present invention.

As seen in FIGURE 1, resin and hardener are supplied from pressurized reservoirs 10 and 12, respectively, to metering pumps 14, 14 which control the volume of resin and hardener supplied to the mixer 16. Pumps 14, 14 are actuated by a proportioning device 18 through hydraulic rams 20, 20 so that a proportioned volume of resin and hardener is supplied at proportioned rates to the mixer throughout the entire actuating motion of the proportioning device. The mixer outlet communicates with bell 15 which is evacuated during injection by pump 17 through check valve 19.

The mixer consists of a body 21 having a cone shaped mixing chamber 22 centrally located therein and a nozzle 24 attached to the body adjacent the wide end of the mixing chamber. The end of the body remote from the nozzle is seated in an aperture 30 in housing 32 on a gum rubber gasket 34 and washer 36 and held thereon by nut 38. Metered amounts of resin and hardener are admitted to the mixing chamber through inlets 26 and 28 past check valves 27 and 29 respectively.

The resin and hardener are mixed in the chamber by stirring rod 40 which is journaled in a pair of roller bearings 42 mounted in an eccentric bearing 44 and set apart by a spacer 46. The rod is forced through a hole 47 in the gasket having a diameter equal to half the diameter of the rod so that the bearing cage is sealed from the mixing chamber. The rubber gasket may be vulcanized to the rod if desired to assure a good seal between the gasket and rod. A shaft 48 journaled on bearings 50 in the housing is connected to the bearing cage and driven through connector 54 by air motor 52 mounted on the housing.

The rod is supported in the bearing with its axis intersecting the axis of the mixer at a point midway through the rubber gasket. The bearing cage is rotated on the shaft axis with the rod turning about the intersection of the two axes and forming a cone of revolution in the mixing chamber. An air motor is used as the driving means because it provides a relatively high rotational speed which causes the rod to mix the hardener and resin immediately. The air motor can be easily throttled to vary the speed and provides automatic slippage in case of overload. The mixing chamber will be purged immediately due to the high speed of the rod and the configuration of the chamber thereby preventing the resin from hardening within the chamber.

In operation the resin and hardener supply chambers are kept under a constant pressure by any suitable means. The diaphragm pump is filled by de-pressurizing air inlet valve 18 and allowing the resin compound or hardener to fill the pump. When the pressure in the pump reaches a predetermined value, the lever system 12 is actuated pressurizing the hydraulic fluid in pump 14. The hydraulic pressure of the fluid will actuate the diaphragm forcing a metered quantity of resin compound or hardener out of each pump and a like amount into the mixing chamber 22 through inlets 26 and 28. The rod 40 is rotated about the axis of the mixer at approximately 5000 r.p.m. forming a cone of revolution in the chamber. With this configuration purging ports are unnecessary, each metered quantity of resin compound and hardener being completely mixed and purged from the mixer almost instantly.

With this assembly it is possible to disassemble the nozzle 24, body 21 and stirring rod 40 by simply removing nut 38 from the housing. Since these are the only parts that come in contact with the resin, they can be easily removed and cleaned in a solvent after use. If excessive wear has occurred on any one of these parts due to the abrasive character of the resin they can be simply replaced by new parts at a minimum of time and cost.

Although but one embodiment of the present invention has been illustrated and described, it will be apparent to those skilled in the art that various changes and modifications may be made therein without departing from the spirit of the invention or from the scope of the appended claim.

We claim:

A fluid mixer comprising:

a body having a cone-shaped mixing chamber therein defined by a single cone-shaped wall surface and having a large and a small end, said body having a plurality of inlet passageways leading to said chamber for introducing the fluids to be mixed into said chamber and an outlet from said chamber positioned adjacent the large end of said chamber and on the axis thereof to facilitate flow of the mixed fluids from said chamber;

an eccentrically mounted stirring rod mounted to rotate in said chamber along said single cone-shaped wall surface, said rod extending into said chamber through an opening at the small end of said chamber;

sealing means for said opening through which said rod extends into said chamber, said sealing means including a flexible disc having an opening therein, said rod extending through said disc opening and in sealing engagement therewith, said rod further being positioned so that its axis intersects the axis of said cone-shaped chamber at a point midway through said disc opening to thus minimize the flexure of said disc when said rod is rotated; and means for rotating said stirring rod.

References Cited in the file of this patent

UNITED STATES PATENTS

| 2,539,463 | Kost | Jan. 30, 1951 |
| 2,788,337 | Preiswerk et al. | Apr. 9, 1957 |

FOREIGN PATENTS

| 610,974 | Great Britain | Oct. 22, 1948 |